(12) United States Patent
Yilmaz

(10) Patent No.: US 12,311,900 B2
(45) Date of Patent: May 27, 2025

(54) WHEEL END BRAKE TEMPERATURE MONITORING IN TRUCKS AND TRAILERS

(71) Applicant: ZF CV Systems Europe BV, Brussels (BE)

(72) Inventor: Mehmet Yilmaz, Lake Orion, MI (US)

(73) Assignee: ZF CV Systems Europe BV, Brussels (BE)

( * ) Notice: Subject to any disclaimer, the term of this patent is extended or adjusted under 35 U.S.C. 154(b) by 492 days.

(21) Appl. No.: 17/673,545

(22) Filed: Feb. 16, 2022

(65) Prior Publication Data

US 2023/0256955 A1 Aug. 17, 2023

(51) Int. Cl.
*B60T 17/22* (2006.01)
*F16D 66/00* (2006.01)

(52) U.S. Cl.
CPC ........ *B60T 17/22* (2013.01); *F16D 2066/001* (2013.01); *F16D 2066/006* (2013.01)

(58) Field of Classification Search
CPC ............... F16D 66/00; F16D 2066/001; F16D 2066/006; B60T 17/22
USPC .......................................................... 303/191
See application file for complete search history.

(56) References Cited

U.S. PATENT DOCUMENTS

| | | | | |
|---|---|---|---|---|
| 5,217,282 A * | 6/1993 | Guichard | ................ | B60T 17/18 303/20 |
| 6,275,763 B1 * | 8/2001 | Lotito | ....................... | B60T 1/10 188/DIG. 1 |
| 6,456,922 B1 * | 9/2002 | Gamberg | ............ | B60T 8/17636 180/197 |
| 2001/0052727 A1 * | 12/2001 | Betts | ........................ | G01L 5/225 303/191 |
| 2006/0207842 A1 * | 9/2006 | Strandberg | ............ | B60T 17/221 188/264 D |
| 2008/0243327 A1 * | 10/2008 | Bujak | .................... | B60W 30/12 340/442 |
| 2011/0066347 A1 * | 3/2011 | Yow | ......................... | B60T 8/885 701/80 |
| 2015/0203194 A1 * | 7/2015 | Griffith | .................... | B60T 8/176 701/3 |
| 2016/0305974 A1 * | 10/2016 | Webster | ............... | G07C 5/0816 |
| 2019/0023252 A1 * | 1/2019 | Miller, Jr. | ............. | B60T 8/1881 |
| 2021/0332849 A1 * | 10/2021 | Gravell | ............... | B60C 23/0408 |

* cited by examiner

*Primary Examiner* — Robert A. Siconolfi
*Assistant Examiner* — San M Aung
(74) *Attorney, Agent, or Firm* — Walter Ottesen, P.A.

(57) ABSTRACT

The disclosure relates to a method for monitoring a brake component temperature of a brake of a vehicle. The method includes measuring a wheel end temperature at a wheel end of a vehicle via a temperature sensor at the wheel end; determining whether the measured wheel end temperature is above a threshold representative of a critical temperature of the brake component; and, outputting a warning signal when the determined wheel end temperature is above the threshold. The disclosure further relates to temperature modeling of the brake component temperature. The methods and systems according to the disclosure enable an anti-lock braking system to monitor brake components for mechanical issues via temperature sensors.

15 Claims, 5 Drawing Sheets

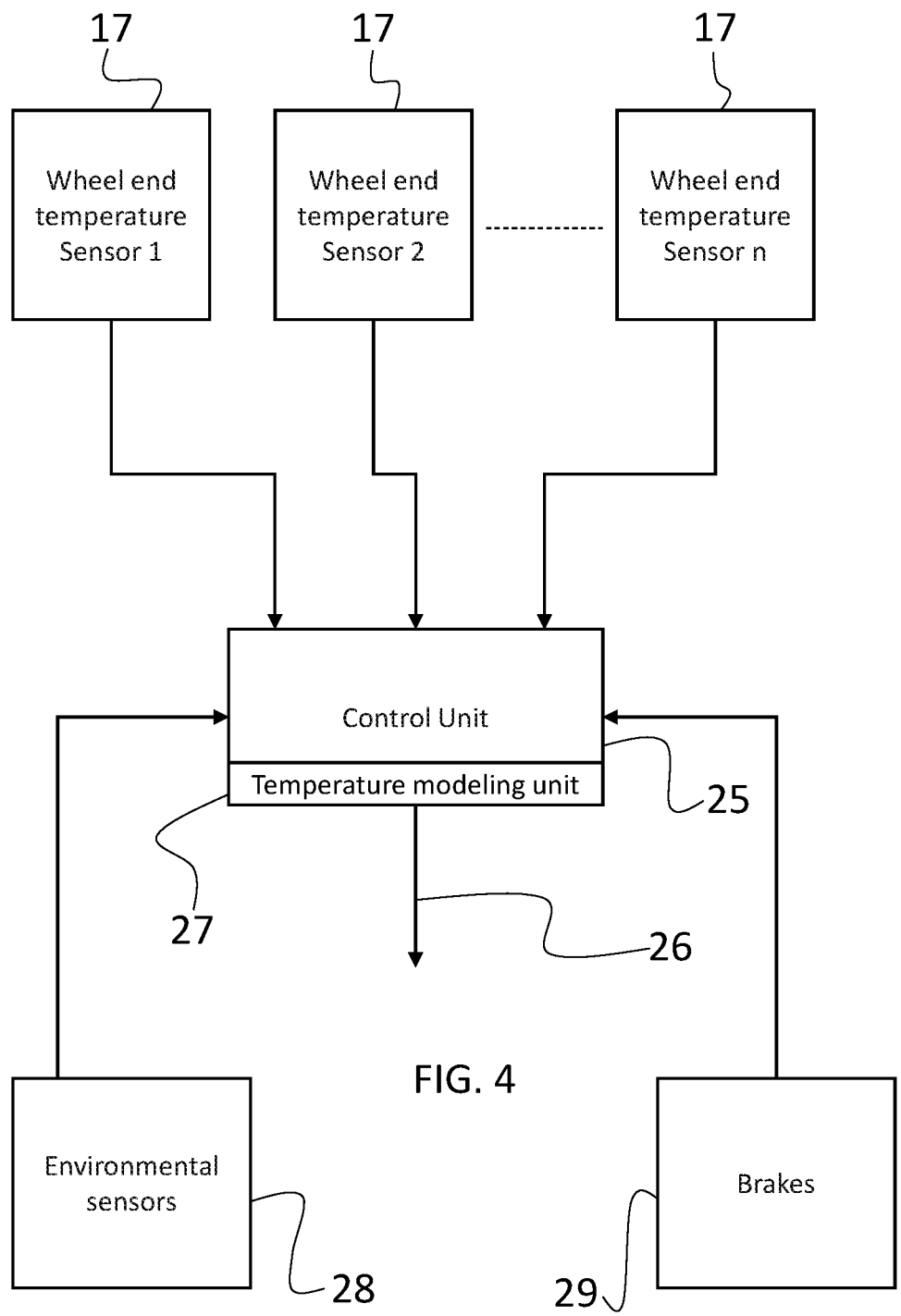

ABSTRACT SKIPPED — this is the specification.

WHEEL END BRAKE TEMPERATURE MONITORING IN TRUCKS AND TRAILERS

TECHNICAL FIELD

The disclosure relates to monitoring a wheel end brake temperature for a brake system in trucks and trailers.

BACKGROUND

Mechanical issues or malfunctions can occur while driving. For example, a truck's brakes may not be fully released, there may be remaining pressure in the brake chamber and/or there can be pure mechanical issues such as locked mechanics. Examples of mechanical issues in the wheel end brakes include, for example, stiff pistons, stiff lever/shaft bearing, and broken or fatigued springs. Such issues or malfunctions occurring on an axle while driving can, for example, cause the brakes to overheat, cause the tires to suddenly deflate or initiate a thermal incident on the truck and/or the trailer.

Thermal incidents on the trailer and other brake system failures as described above can result in trucks and/or trailers being put out of service which, in turn, can cause shipping delays, repair costs, increased shipping costs and the like. Further, disabled trailers and trucks can further result in serious traffic incidents and safety issues.

The current Anti-lock Braking System (ABS)/Electronic Braking System (EBS) brake systems use wheel speed sensors (WSS) to determine the speed of the wheel and have no ability to detect wheel end specific malfunctions such as locked mechanics, a remaining pressure in the brake chamber, etc.

SUMMARY

It is an object of the disclosure to provide a method for monitoring a wheel end brake temperature in a truck and trailer.

The aforementioned object can, for example, be achieved via a method for monitoring a brake component temperature of a brake of a vehicle. The method includes measuring a wheel end temperature at a wheel end of a vehicle via a temperature sensor at the wheel end; determining whether the measured wheel end temperature is above a threshold representative of a critical temperature of the brake component; and, outputting a warning signal when the determined wheel end temperature is above the threshold.

According to an embodiment, the determining whether the measured wheel end temperature is above the threshold includes: determining via a control unit a temperature value of a brake component on a basis of the measured temperature at the wheel end and at least one of a distance of the temperature sensor to the corresponding brake component, and environmental conditions.

According to an embodiment, the operating state of the brake is taken into consideration when determining the temperature value of the brake component.

According to an embodiment, the temperature sensor is integrated into an active wheel speed sensor.

According to an embodiment, the brake component monitored by the method is a brake drum or a brake disc.

The aforementioned object can, for example, also be achieved via a further method for monitoring at least one of a disc temperature and a drum temperature of a brake of a vehicle. The method includes measuring a wheel end temperature at a wheel end of a vehicle via a temperature sensor at the wheel end; calculating a brake component temperature on a basis of the measured wheel end temperature and at least one of environmental conditions and a distance of the temperature sensor from the brake component; determining whether the calculated brake component temperature is above a threshold; and, outputting a warning signal when the determined brake component temperature is above the threshold.

It is also an object of the disclosure to provide a system for monitoring a wheel end brake temperature in a truck and trailer.

The aforementioned object can, for example, be achieved via a wheel end brake temperature monitoring system. The system includes a temperature sensor arranged at a wheel end of a vehicle configured to measure a measured wheel end temperature; an electronic control unit configured to receive the measured wheel end temperature from the temperature sensor; the electronic control unit being configured to compare the measured wheel end temperature to a threshold value and output a warning signal when the measured wheel end temperature is above the threshold value.

According to an embodiment, the wheel end brake temperature monitoring system includes an electronic control unit having a temperature modeling unit.

According to an embodiment, the wheel end brake temperature monitoring system includes a temperature modeling unit which is configured to calculate a brake component temperature taking into consideration the measured wheel end temperature, and a distance of the wheel speed sensor to the brake component.

According to an embodiment, the wheel end brake temperature monitoring system includes a temperature modeling unit configured to further take environmental conditions into account when calculating the brake component temperature.

According to an embodiment, the wheel end brake temperature monitoring system has a temperature sensor which is integrated in an active wheel speed sensor.

According to an embodiment, the brake component monitored by the system is a brake drum or a brake disc.

Monitoring the wheel end temperature according to the disclosure increases the safety of the vehicle itself and the safety of other traffic participants. Further, via temperature monitoring, downtime of the vehicle and costs related thereto such as repair, idle and unproductive driver time, potential delivery delays or inability to keep made commitments and associated lost business opportunities can be avoided.

BRIEF DESCRIPTION OF THE DRAWINGS

The invention will now be described with reference to the drawings wherein.

DESCRIPTION OF THE PREFERRED EMBODIMENTS

Figure 1:
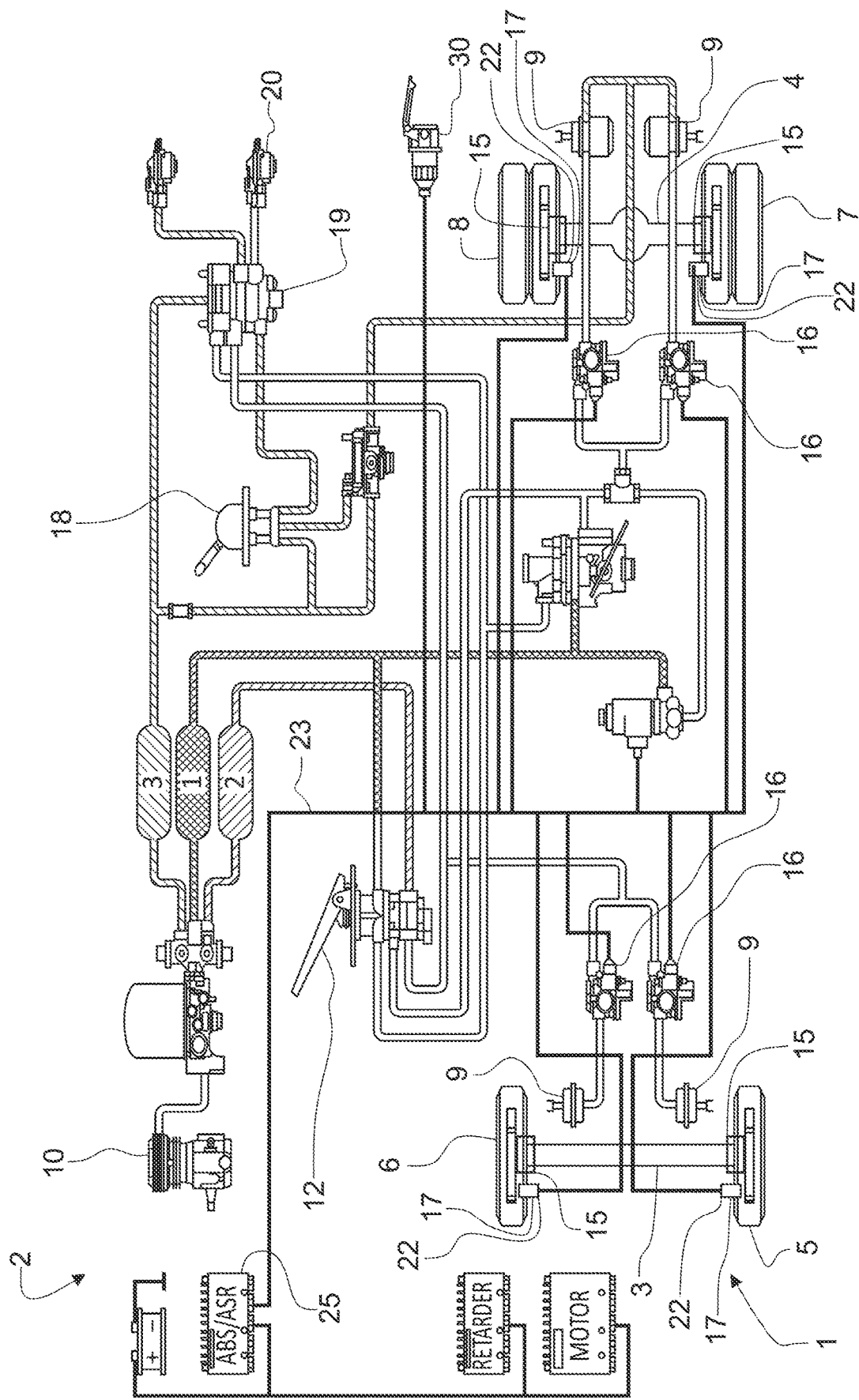
FIG. 1 shows an anti-lock braking system of a vehicle with temperature monitoring of a brake component.

FIG. 1 shows a vehicle 1 having anti-lock braking system (ABS) 2. The description below also applies to an electronic braking system (EBS). In the shown embodiment, the front axle 3 has a first front wheel 5 and a second front wheel 6 mounted on either side or end of the front axle 3. The rear axle 4 has a first rear wheel pair 7 and a second rear wheel pair 8 mounted on either side or end thereof. The wheel configuration is used as an example, other wheel configurations, for example, with single wheels on the rear axle, multiple rear axles, et cetera, are also possible. Various trailer configurations are also possible. A brake chamber 9 is provided for each front wheel 5, 6 and each rear wheel pair 7, 8. The brake chambers 9 are each activated via a corresponding brake valve 16 which can be actuated by an operator, for example, via a brake pedal 12. A compressor 10 acts as a pressure source for activating brake chambers 9. In the embodiment shown in FIG. 1, the brake chambers 9 associated with the rear wheel pairs 7, 8 of the rear axle 4 are configured as tristop cylinders. The anti-lock braking system of the shown embodiment further includes a hand brake valve 18 which can also activate the brake chambers 9 of the wheel pairings 7, 8.

In the shown embodiment of FIG. 1, the vehicle 1 is a towing vehicle. The compressor can be operatively connected to brake chambers of a trailer vehicle via a trailer control valve 19 and a coupling head 20. The anti-lock braking system 2 provides power for a trailer anti-lock braking system via the standardized trailer plug connection 30. An actuation of the brakes caused by the operator actuating the brake pedal 12 is conveyed to the trailer vehicle via the trailer control valve 19 and the coupling head 20.

The anti-lock braking system 2 can monitor the speed of a wheel via a wheel speed sensor unit 22. In the embodiment shown in FIG. 1, each of the front wheels has a wheel speed sensor unit 22 to detect the wheel speed of the corresponding wheel. Further, each of the rear wheel pairs has a wheel speed sensor unit 22 to detect the wheel speed of the corresponding wheel pair. The wheel speed sensor units 22 output the detected wheel speed to a control device, for example, an ABS electronic control unit 25. Wheel speed sensor units 22 associated with wheels or wheel pairs of a trailer vehicle can, for example, be received by the control unit 25 via a trailer plug connection 30.

The control unit 25 uses the signals received from the wheel speed sensor units 22 to calculate the vehicle speed based on the single wheel speeds. Additionally, the control unit 25 can calculate wheel deceleration and acceleration values and, if necessary, can actuate a solenoid control valve 32 to prevent a locking of the vehicle wheels. The control unit 25 can also alert the driver to any faults in the anti-lock braking system 2, for example via a warning sound, a warning light, or other visual warning on a display and/or screen.

In an embodiment of the wheel speed sensor unit 22, the wheel speed sensor unit 22 can be configured as a rod sensor and a pole wheel for picking up the rotational movement of the wheel. The wheel speed sensor units 22 can, for example, be clamped in a hole in the axle or clamped thereto via a bracket. The rod sensor operates inductively and includes a magnet, a round pole pin, and a coil. A rotation of the pole wheel connected to a wheel hub produces a change in the magnetic flux picked up by the sensor coil and thereby generates an alternating voltage. The frequency of this alternating voltage is proportional to the wheel speed. The wheel speed sensor units 22 can be connected to the control unit 25 via wiring 23.

According to an embodiment of the disclosure, the wheel speed sensor unit 22 of an ABS system 2 further includes a temperature sensor 17.

The number of wheel speed sensor units 22 used in the anti-lock braking system 2 depends on the vehicle and the configuration of the anti-lock braking system 2. The anti-lock braking system 2 can control the pressure in a corresponding brake chamber 9 when the control unit 25 detects a tendency to lock on the corresponding specific wheel where the friction might be lower compared with other monitored wheels based on a calculated reference speed which is an average from all available individual wheel speed values.

The anti-lock braking system has the capability to keep all wheels rolling and helps to increase the active safety. Only rolling wheels can transfer brake force and cornering force to the road properly and ensure the vehicle's steerability while the driver is able to maintain full control over the vehicle under all circumstances.

According to an embodiment, the temperature at each individual wheel end is monitored via a temperature sensor 17 while the vehicle 1 is in operation. If the wheel end temperature at any of the wheels 5, 6, 7, 8 exceeds a threshold value, a warning signal 26 can be outputted by the control unit 25. The warning signal 26 can, for example, cause a warning light in the dashboard to become active or otherwise inform the driver of the warning. A temperature measured by the temperature sensor 17 at the wheel end can be representative of a temperature of a brake component 15 or can be used to determine the temperature of the brake component 15 based on factors including the temperature sensor installation position. The brake component 15 can, for example, be the brake disc of a disc brake or a brake drum of a drum brake.

According to an embodiment, the temperature sensor 17 is integrated into the wheel speed sensor unit 22. The integrated temperature sensor 17 is connected to control unit 25 and provides the control unit 25 with the local temperature for each wheel end. Depending on the distance between the temperature sensor 17 and the brake component 15, the temperature detected at the temperature sensor 17 may not reflect the actual temperature at the brake component 15.

According to an embodiment, the individually measured brake component 15 temperatures are inputted into a temperature modelling unit 27, for example, embodied in the control unit 25. The temperature modeling unit 27 calculates a brake component temperature based on factors which can include the temperature measured by the temperature sensor 17, the distance of the temperature sensor 17 to the brake component 15, environmental conditions, braking status, speed of the vehicle 1, et cetera. If the calculated brake component 15 temperature exceeds a defined threshold (Th_critical), a warning signal is outputted by the control unit 25. The threshold Th_critical for a brake disc can be significantly different from a threshold Th_critical for a brake drum. The temperature modeling unit can be integrated in the control unit 25.

According to an embodiment, the control unit 25 is configured to monitor a temperature gradient of the measured wheel end temperature or the brake component 15 temperature. The monitored temperature gradient is compared to a temperature gradient threshold.

According to an embodiment, an average wheel end temperature is determined from the individually measured wheel end temperatures. The control unit 25 receives the individual wheel end temperatures measured by the corresponding temperature sensors 17 and determines an average therefrom. The threshold can be a defined difference from the determined average wheel end temperature. Alternatively, the control unit 25 may convert the measured wheel end temperatures to brake component temperatures and subsequently determine an average brake component temperature.

Mechanical or pneumatic issues such as a mechanical blockage that may keep the wheel ends active or cause a residual pressure to remain in the brake chambers can cause an overheating of brake component 15. For example, stiff pistons, stiff lever/shaft bearings, broken or fatigued springs and the like can keep the wheel end brake active. Such overheating of the wheel can cause sudden tire deflation and/or a thermal incident in the truck and/or trailer.

The temperature sensor 17 in the wheel speed sensor unit 22 enables the measuring of the brake component 15 temperature based on factors including, for example, the installation position of the temperature sensor 17 and the environmental conditions. Active wheel speed sensors (AWSS) may already have temperature sensors integrated therein. The AWSSs of existing anti-lock braking systems are typically not installed close enough to the disc/drum so that the measured temperature does not reflect the real wheel end (disc/drum) temperature. If the temperature measured at the wheel end does not adequately represent a brake disc/drum temperature, a temperature model can consider the installation position and the environmental conditions and calculate a disc/drum temperature.

According to an embodiment, when a calculated disc/drum temperature exceeds a first threshold (Th_wo) without braking or a second threshold (Th_wb) with braking, the control unit outputs a warning signal.

According to an embodiment, the status of the brakes, including the duration in which they were engaged, is monitored and considered in calculating the temperature of the brake component 15.

Unlike typical wheel speed sensors, active wheel speed sensors can include temperature sensors. Existing ABS/EBS systems which use active wheel speed sensors which include temperature sensors can have their control unit updated such that additional control software for temperature monitoring is installed and run thereon. The additional control software can further include a temperature modeling software. Existing ABS/EBS systems which support AWSS can also be supplemented with an additional control unit.

According to an embodiment, the wheel speed sensor unit or active wheel speed sensor has two pins connected with the electronic control unit (ECU). The number of WSS/AWSSs installed in the vehicle can depend on the vehicle/system configuration. The available ECUs are designed for each required use case with the respective number of pins and connectors.

In an embodiment for monitoring the temperature of a brake component, the wheel end temperatures of a vehicle 1 are measured via a temperature sensor 17. The measured values are outputted to a control unit 25. The control unit 25 may be a separate control unit or can be a control unit 25 for the system 2. In configurations where the temperature sensor 17 is disposed in close proximity to the brake component which is to be monitored, the measured temperature at the wheel end corresponds or correlates to the temperature of a brake component 15.

In an embodiment, where the temperature sensor 17 is integrated into a wheel speed sensor unit 22 disposed at a distance to the brake component 15, a temperature modeling unit 27 is provided. The temperature modeling unit 27 calculates a temperature of a brake component 15 or a value representative thereof. Factors used in calculating the brake component temperature can include, for example, distance of the temperature sensor 17 to the brake component 15, an outside temperature, status of the brakes, the speed at which the vehicle 1 is traveling and the like. If the calculated temperature is above the threshold value, a warning signal is outputted.

In an embodiment, the calculated temperature is compared to a first threshold (Th_wb) if the vehicle's brakes are engaged and a second threshold (Th_wo) if the brakes are not engaged.

According to an embodiment, the active brake times of the brakes are monitored. The active brake times are used for determining the threshold(s). Active use of the brakes increases the temperature of the brake component and factoring the amount of active braking into the determination of the threshold can ascertain if the temperature of the brake component results from active braking or from a mechanical malfunction and the like.

Figure 2:
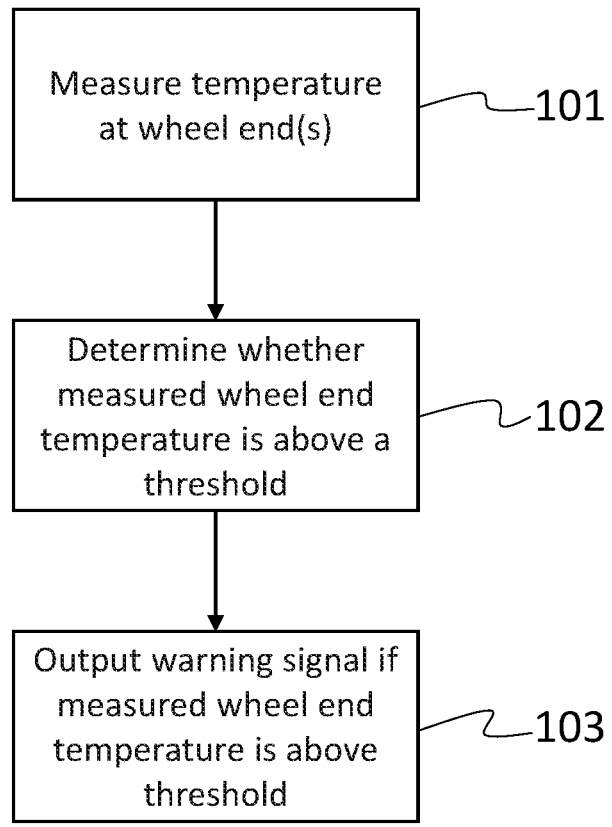
FIG. 2 shows an embodiment of a method according to the disclosure.

FIG. 2 shows an embodiment of a method according to the disclosure. In a first step 101, the temperature at a wheel end is measured. It is, in a second step 102, then determined whether the measured wheel end temperature exceeds a threshold value. If the temperature measured in step 101 exceeds the threshold as determined in step 102, a warning signal is outputted in step 103.

Figure 3A:
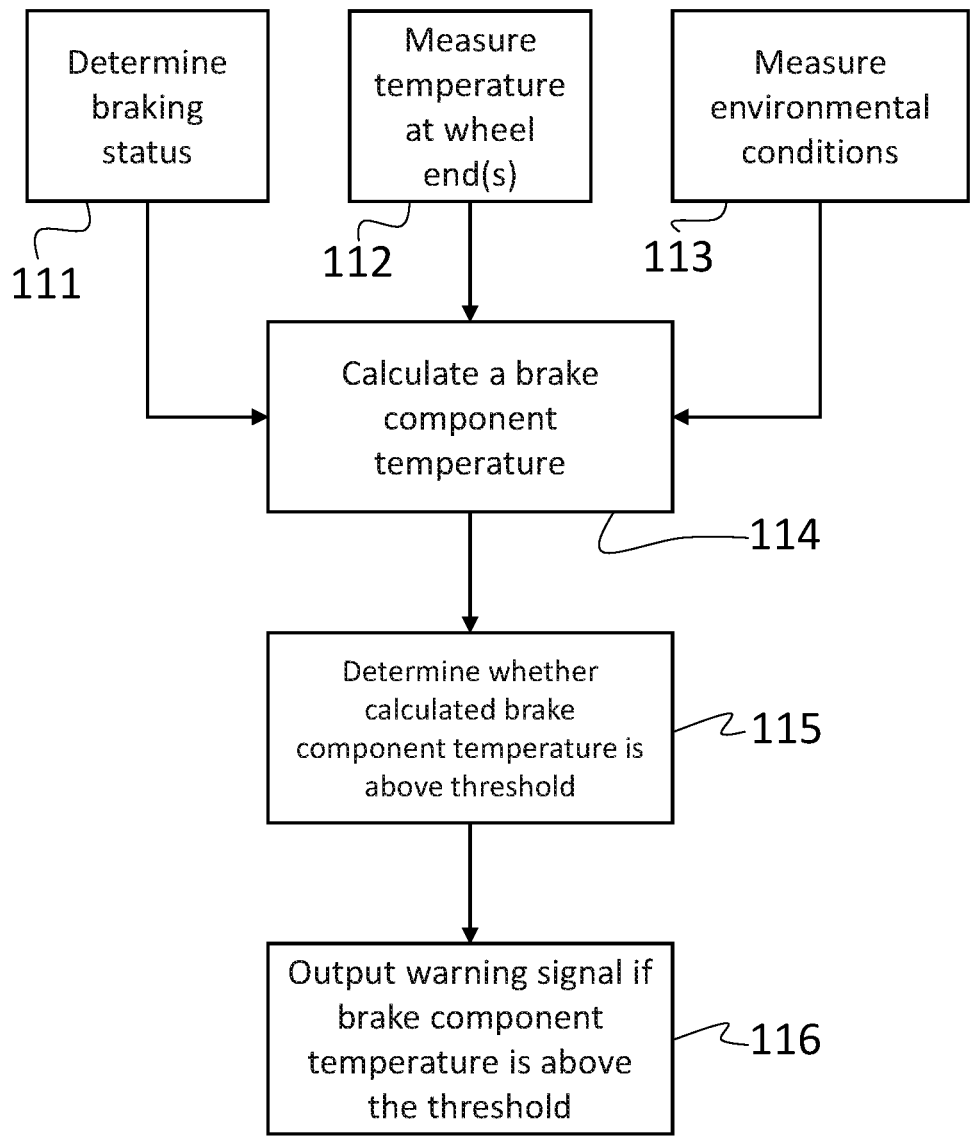
FIG. 3A shows a further embodiment of a method according to the disclosure.

FIG. 3A shows a further embodiment of a method according to the disclosure. The status of the brakes is determined (111), the temperature at a wheel end is measured (112), and environmental conditions such as outside temperature, humidity, et cetera, are determined (113) and outputted to a control unit 25. The control unit 25 calculates the temperature of a brake component 15 or a value representative thereof (114). It is then determined whether the calculated temperature value (114) by the control unit 25 is above a threshold. If the temperature calculated (114) is determined to be above the threshold (115), a warning signal 26 can be outputted (116).

Figure 3B:
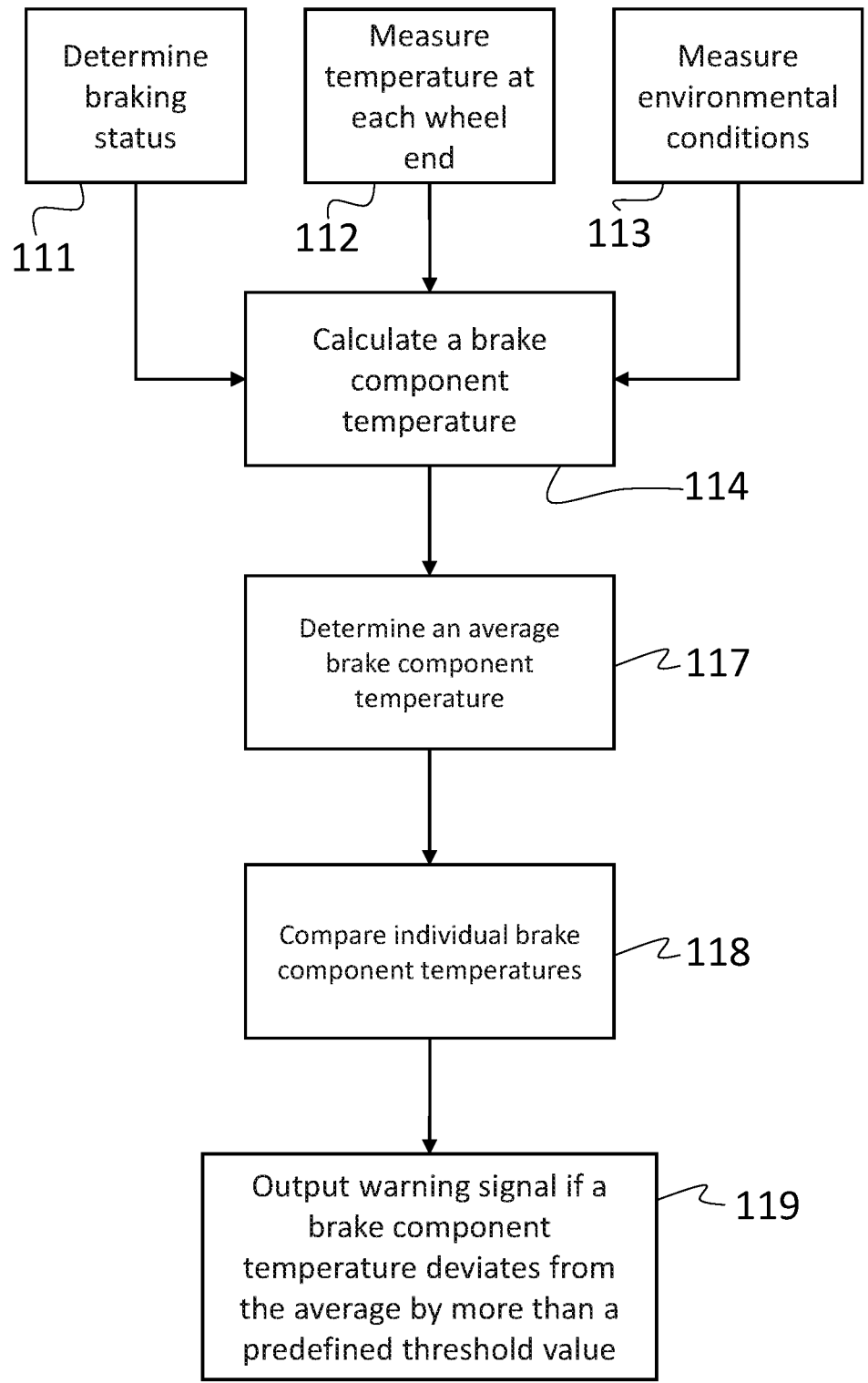
FIG. 3B shows a further embodiment of a method according to the disclosure; and, FIG. 4 shows a control unit having a temperature modeling unit.

FIG. 3B shows an alternate embodiment of the method shown in FIG. 3A, wherein an average brake component temperature is determined in step 117. The individual brake component temperatures calculated in step 114 are then compared to the determined average brake component temperature in step 118. In step 119, a warning signal is outputted when an individual brake component deviates from the average by more than a predefined threshold value.

According to an embodiment, the threshold is a fixed value based on a parameter. According to a further embodiment, the threshold can be a rate of temperature increase. The control unit 25 can be configured to output a warning signal, for example, if the control unit 25 determines a temperature gradient above a predetermined threshold over a defined time period. Accordingly, a sudden increase in temperature at the wheel end caused by a mechanical issue at the brake can be detected by the temperature monitoring system according to the disclosure. This detection can cause an operator to stop and avoid further damage to the vehicle, prevent an accident and the like.

According to an embodiment, the control unit 25 detecting a progressive temperature increase above a predetermined threshold at one wheel end via the corresponding temperature sensor 17 causes the control unit 25 to output a warning signal. The control unit 25 can consider environmental factors, brake status and the like to determine if a temperature increase at a wheel end is unexplained, that is, not caused for example by active braking, high environmental temperatures and the like.

FIG. 4 shows a control unit 25 having a temperature modeling unit 27. The program code can be configured to perform methods according to the disclosure when executed by a processor. The control unit 25 receives wheel end temperatures measured by temperature sensors 17. The control unit 25 can further receive environmental data from environmental sensors 28 or via a communications link. The control unit 25 can include the processor and a non-transitory computer readable storage medium having program code stored thereon. When the control unit 25 is the ABS control unit, the status of the brakes 29 can also be considered. If the control unit 25 is embodied separately from the ABS control unit, the ABS control unit can provide the brake status to the control unit 25. When the control unit 25 receives the wheel end temperatures, the temperature modeling unit calculates the temperature of the brake component 15. The control unit 25 outputs a warning signal 26 if the calculated temperature of the brake component 15 exceeds a threshold. The threshold Th_critical can be a parameterizable value. According to an embodiment, the measured wheel end temperature is multiplied by a predetermined factor to be considered which can be based on a distance from the brake component being monitored. Further, a multiplier can be used to account for the outside temperature and the like. The factors to account for the distance between temperature sensor 17 and the brake component 15, environmental conditions, brake status and the like can be predetermined for an individual vehicle, a model type, a vehicle type, etc. The factors can also be updated after the fact, for example, via software updates to the control unit 25.

It is understood that the foregoing description is that of the preferred embodiments of the invention and that various changes and modifications may be made thereto without departing from the spirit and scope of the invention as defined in the appended claims.

LIST OF REFERENCE NUMERALS

1 Vehicle
2 Anti-lock Braking System (ABS)/Electronic Braking System (EBS)
3 Front axle
4 Rear axle
5 First front wheel
6 Second front wheel
7 First wheel pair
8 Second wheel pair
9 Brake chamber
10 Compressor
12 Brake pedal
15 Brake component
16 Brake valve
17 Temperature sensor
18 Hand brake valve
19 Trailer control valve
20 Coupling head
22 Wheel speed sensor unit
23 Wiring
25 Control unit
26 Warning signal
27 Temperature modeling unit
28 Environmental sensors
29 Brakes
30 Trailer plug connection
32 Solenoid control valve

What is claimed is:

1. A method for monitoring a brake component temperature of a brake of a vehicle, the method comprising:
measuring a wheel end temperature at a wheel end of a vehicle via a temperature sensor at the wheel end, wherein the temperature sensor is integrated into an active wheel speed sensor;
determining whether said measured wheel end temperature is above a threshold representative of a critical temperature of the brake component, wherein said determining whether the measured wheel end temperature is above the threshold includes: determining via a control unit a temperature value of a brake component on a basis of the measured temperature at the wheel end and at least one of a distance of the temperature sensor to the corresponding brake component, and environmental conditions; and,
outputting a warning signal when said determined wheel end temperature is above the threshold.

2. The method of claim 1, wherein said measuring said wheel end temperature is performed at each wheel end of the vehicle having an associated brake component; wherein said determining whether said measured wheel end temperature is above the threshold includes:
determining an average wheel end temperature from each of the measured wheel end temperatures; and,
comparing individual measured wheel end temperatures to the determined average wheel end temperature to determine whether any of the individual measured wheel end temperatures is above the threshold, wherein the threshold is relative to the determined average wheel end temperature.

3. The method of claim 2, wherein said determining whether said measured wheel end temperature is above the threshold includes: converting the measured wheel end temperature to a brake component temperature of the brake component associated with the wheel end, wherein the measured wheel end temperature is converted to the brake component temperature on the basis of at least one of a distance between the temperature sensor at the wheel end to the brake component, environmental conditions, and a status of the brake.

4. The method of claim 1, wherein an operating state of the brake is taken into consideration when determining the temperature value of the brake component.

5. The method of claim 1, wherein the brake component is a brake drum or a brake disc.

6. A method for monitoring a temperature of at least one of a disc and a drum of a brake of a vehicle, the method comprising:
measuring a wheel end temperature at a wheel end of a vehicle via a temperature sensor at the wheel end, wherein the temperature sensor is integrated into an active wheel speed sensor;
calculating a brake component temperature on a basis of the measured wheel end temperature and at least one of environmental conditions and a distance of the temperature sensor from a brake component;
determining whether the calculated brake component temperature is above a threshold; and,
outputting a warning signal when said determined brake component temperature is above the threshold.

7. The method of claim 6, wherein the brake component is a brake disc.

8. The method of claim 6, wherein the brake component is a brake drum.

9. A wheel end brake temperature monitoring system comprising:
- a temperature sensor arranged at a wheel end of a vehicle configured to measure a measured wheel end temperature, wherein the temperature sensor is integrated into an active wheel speed sensor;
- an electronic control unit configured to receive the measured wheel end temperature from said temperature sensor and to calculate a brake component temperature taking into consideration the measured wheel end temperature, and a distance of the wheel speed sensor to a brake component; and,
- said electronic control unit being configured to compare the brake component temperature to a threshold value and output a warning signal when the measured wheel end temperature is above the threshold value.

10. The wheel end brake temperature monitoring system of claim 9, wherein said electronic control unit includes a temperature modeling unit.

11. The wheel end brake temperature monitoring system of claim 10, wherein said temperature modeling unit is configured to calculate a brake component temperature taking into consideration the measured wheel end temperature, and a distance of the wheel speed sensor to a brake component.

12. The wheel end brake temperature monitoring system of claim 11, wherein said temperature modeling unit is configured to further take environmental conditions into account when calculating the brake component temperature.

13. The wheel end brake temperature monitoring system of claim 11, wherein the brake component is a brake drum or a brake disc.

14. The wheel end brake temperature monitoring system of claim 9, wherein the system includes a plurality of temperature sensors;
- wherein each wheel of the vehicle has at least one of said plurality of temperature sensors configured to measure the wheel end temperature of a corresponding wheel associated therewith;
- wherein said electronic control unit is configured to determine an average wheel end temperature from the wheel end temperatures measured at each wheel; and,
- wherein said threshold value is relative to the determined average wheel end temperature.

15. The wheel end brake temperature monitoring system of claim 11, wherein the system includes a plurality of temperature sensors;
- wherein each wheel of the vehicle having a brake component associated therewith has at least one of said plurality of temperature sensors configured to measure the wheel end temperature of a corresponding wheel associated therewith;
- wherein said electronic control unit is configured to convert each measured wheel end temperature to the corresponding brake component temperature of the brake component associated with the wheel end, wherein the measured wheel end temperature is converted to the brake component temperature on the basis of at least one of a distance between the temperature sensor at the wheel end to the brake component, environmental conditions, and a status of a brake; and,
- wherein said electronic control unit is configured to determine an average brake component temperature from the converted brake component temperatures at each wheel; and,
- wherein said threshold value is relative to the determined average brake component temperature.

* * * * *